US012617558B2

(12) United States Patent
    Denham

(10) Patent No.: US 12,617,558 B2
(45) Date of Patent: May 5, 2026

(54) TRAM SYSTEMS FOR SPACE VEHICLES

(71) Applicant: The Aerospace Corporation, El Segundo, CA (US)

(72) Inventor: Donald Wayne Denham, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 1123 days.

(21) Appl. No.: 17/498,092

(22) Filed: Oct. 11, 2021

(65) Prior Publication Data

US 2022/0024610 A1    Jan. 27, 2022

Related U.S. Application Data

(63) Continuation-in-part of application No. 15/945,617, filed on Apr. 4, 2018, now Pat. No. 11,155,366, which is a continuation-in-part of application No. 15/655,972, filed on Jul. 21, 2017, now Pat. No. 11,643,225.

(51) Int. Cl.
    *B64G 1/64*        (2006.01)
    *H02K 41/02*        (2006.01)
(52) U.S. Cl.
    CPC ............. *B64G 1/646* (2013.01); *H02K 41/02* (2013.01)
(58) Field of Classification Search
    CPC ...... B64G 1/223; B64G 1/6462; B64G 1/646; B64G 1/645; B61B 13/08; H02P 25/06; H02P 8/005
    See application file for complete search history.

(56) References Cited

U.S. PATENT DOCUMENTS

| | | | |
|---|---|---|---|
| 3,169,725 A | | 2/1965 | Berglund |
| 3,391,881 A | * | 7/1968 | Maltby ................ B64G 1/6462 |
| | | | 285/317 |
| 3,744,739 A | | 7/1973 | Weaver et al. |
| 3,785,590 A | | 1/1974 | Wentworth |
| 3,804,022 A | | 4/1974 | Schwarzler et al. |
| | | (Continued) | |

FOREIGN PATENT DOCUMENTS

| | | | | |
|---|---|---|---|---|
| CN | 106026839 A | * | 10/2016 | ......... B60G 17/0157 |
| CN | 106516161 A | | 3/2017 | |
| | | (Continued) | | |

OTHER PUBLICATIONS

Examination Report issued in EP Application No. 18836031.7 on Jul. 25, 2023.

(Continued)

*Primary Examiner* — Magdalena Topolski
(74) *Attorney, Agent, or Firm* — LeonardPatel PC

(57)        ABSTRACT

Tram systems for space vehicles are movable thereon. When the space vehicle is a nested ring cell, for example, the structural ring portion of the design may be mostly or completely passive and contain conducting parts, such as electrical steel. The moving trams may use field coils instead of magnets to generate the magnetic flux to propel the tram. Additional coils on the tram may steer the magnetic flux to generate the forward or reverse thrust forces. These coils may also add the overall motive flux.

27 Claims, 11 Drawing Sheets

(56) References Cited

U.S. PATENT DOCUMENTS

| | | | | |
|---|---|---|---|---|
| 4,588,150 | A | * | 5/1986 | Bock .................... B64G 1/6462 |
| | | | | 244/172.4 |
| 4,715,566 | A | | 12/1987 | Nobles |
| 4,917,215 | A | | 4/1990 | Pratt |
| 5,017,820 | A | | 5/1991 | Culp |
| 5,104,070 | A | | 4/1992 | Johnson et al. |
| 5,305,970 | A | | 4/1994 | Porter et al. |
| 5,343,811 | A | | 9/1994 | Schuster |
| 5,580,013 | A | | 12/1996 | Velke |
| 5,735,488 | A | * | 4/1998 | Schneider ............ B64G 1/1078 |
| | | | | 294/98.1 |
| 6,402,624 | B1 | | 6/2002 | Larson et al. |
| 6,536,712 | B1 | | 3/2003 | Barenett |
| 6,568,638 | B1 | | 5/2003 | Capots |
| 6,619,031 | B1 | | 9/2003 | Balepin |
| 6,937,125 | B1 | | 8/2005 | French |
| 9,050,896 | B2 | * | 6/2015 | Brier ......................... H02P 3/14 |
| 9,178,401 | B2 | * | 11/2015 | Sugita ..................... H02K 9/20 |
| 9,496,815 | B2 | * | 11/2016 | Kadynski ................ H02P 25/06 |
| 9,617,016 | B2 | | 4/2017 | Palmer et al. |
| 10,447,383 | B1 | * | 10/2019 | Haas, Jr. ............. B64G 1/1014 |
| 10,683,019 | B2 | | 6/2020 | Laffin |
| 10,744,886 | B2 | * | 8/2020 | Lee ....................... B61B 13/125 |
| 2001/0020429 | A1 | * | 9/2001 | Serrano ................... B61B 13/00 |
| | | | | 105/141 |
| 2002/0066828 | A1 | | 6/2002 | Nakamura et al. |
| 2005/0166785 | A1 | * | 8/2005 | Schramek ............ E01B 25/305 |
| | | | | 104/282 |
| 2008/0000515 | A1 | | 1/2008 | Lin et al. |
| 2009/0078818 | A1 | | 3/2009 | Zulkowski et al. |
| 2009/0230250 | A1 | | 9/2009 | Wehner et al. |
| 2010/0264256 | A1 | | 10/2010 | Yim et al. |
| 2010/0301676 | A1 | | 12/2010 | Hernandez et al. |
| 2011/0180669 | A1 | | 7/2011 | Johnson et al. |
| 2012/0199697 | A1 | | 8/2012 | Nagabhushan et al. |
| 2014/0246544 | A1 | | 9/2014 | Bullard et al. |
| 2014/0263844 | A1 | | 9/2014 | Cook, Jr. et al. |
| 2016/0130019 | A1 | | 5/2016 | Jaeger |
| 2017/0042794 | A1 | * | 2/2017 | Wenzel ................ A61K 8/9794 |
| 2017/0043794 | A1 | | 2/2017 | Boulanger |
| 2017/0055381 | A1 | | 2/2017 | Tan et al. |
| 2019/0161213 | A1 | | 5/2019 | Kreisel |

FOREIGN PATENT DOCUMENTS

| | | | | | |
|---|---|---|---|---|---|
| DE | 102014104695 | A1 | 10/2015 | | |
| EP | 0541052 | B1 | 2/1996 | | |
| GB | 2512088 | B | 5/2019 | | |
| JP | S63297199 | A | 12/1988 | | |
| JP | H01226498 | A | 9/1989 | | |
| JP | H0310998 | A | 1/1991 | | |
| JP | H0487900 | A | 3/1992 | | |
| JP | H04189700 | A | 7/1992 | | |
| JP | H05330500 | A | 12/1993 | | |
| JP | 2001253400 | A | 9/2001 | | |
| JP | 2011240719 | | 12/2011 | | |
| JP | 2013046460 | A | * | 3/2013 | ........... H02K 41/033 |
| JP | 2015168422 | A | 9/2015 | | |
| JP | 2015527860 | A | 9/2015 | | |
| WO | 2008075894 | A1 | 6/2008 | | |
| WO | 2016130669 | A1 | 8/2016 | | |
| WO | 2017194058 | A1 | 11/2017 | | |

OTHER PUBLICATIONS

James Lee, "Examiner's Answer", issued Sep. 4, 2020, U.S. Appl. No. 15/655,972.

James Lee, "Non-Final Office Action", issued May 26, 2022, U.S. Appl. No. 15/655,972.

Notice of Acceptance issued in New Zealand Application No. 760992 on May 11, 2022.

Notice of Acceptance issued in New Zealand Application No. 760993 on May 11, 2022.

Second Examination Report issued in New Zealand Application No. 760992 on Nov. 1, 2021.

Third Examination Report issued in New Zealand Application No. 760992 on Nov. 1, 2021.

Examination Report issued in European Application No. 18834388.3 on Nov. 15, 2022.

James Lee, "Final Office Action", issued Nov. 18, 2022, U.S. Appl. No. 15/655,972.

Barnhart, et al., "Changing Satellite Morphology Through Cellularization", AIAA Space 2012 Conference & Exposition, Sep. 11, 2012.

Extended European Search Report, issued Nov. 27, 2024, EP Patent Application No. 24195038.5.

Magdalena Topolski, "Non-Final Office Action", issued Dec. 23, 2024, U.S. Appl. No. 18/185,709.

Magdalena Topolski, "Restriction Requirement", issued Dec. 23, 2024, U.S. Appl. No. 18/335,954.

Michael B Kreiner, "Restriction Requirement", issued Oct. 11, 2024, U.S. Appl. No. 18/185,709.

"G Gauge—Cross Clover Eztec Track Layout for Battery Operated Trains" published by Variety Discount, available at https://www.youtube.com/watch?v=6mE-5p4ICNs (Apr. 17, 2017).

"How to build a basic garden railroad, part 1" published by Garden Railways Mag, available at https://www.youtube.com/watch?v=rTpaHKF3-VQ (Apr. 3, 2012).

Blaine R. Copenheaver, "International Search Report & Written Opinion", issued Oct. 18, 2018, PCT Patent Application No. PCT/US18/37651.

Cubli Page, http://robohub.org/swiss-robots-cubli-a-cube-that-can-jump-up-balance-and-walk-across-your-desk/ (last accessed Jul. 21, 2017).

DARPA "Satlets" Page, http://spectrum.ieee.org/tech-talk/aerospace/satellites/darpas-satellite-revival-program-gears-up-for-first-launch (last accessed Jul. 21, 2017).

DARPA Hydra System Page, https://www.darpa.mil/program/hydra (last accessed Jul. 21, 2017).

David Barnhart et al., "Changing Satellite Morphology through Cellularization," AIAA Space 2012 Conference & Exposition, Reston, Virginia (Sep. 11, 2012).

David Barnhart et al., "Changing Satellite Morphology through Cellularization," American Institute of Aeronautics and Astronautics (Sep. 2012).

Detailed MIT M-Blocks Page, http://news.mit.edu/2013/simple-scheme-for-self-assembling-robots-1004 (last accessed Jul. 21, 2017).

Edwin A. Peraza-Hernandez, Darren J. Hartl, Richard J. Malak Jr., and Dimitris C. Lagoudas, "Origami-Inspired Active Structures: A Synthesis and Review," Smart Materials and Structures DOI: 10.1088/0964-1726/23/9/094001 (Aug. 2014).

First Examination Report issued in NZ Application No. 760992 on May 11, 2021.

First Examination Report issued in NZ Application No. 760993 on May 11, 2021.

H. Helvajian, "The generation after next: Satellites as an assembly of mass producible functionalized modules," Small Satellites: Past Present and Future, H. Helvajian, S. W. Janson Eds. (AIAA Press, Reston, VA), pp. 815-858 (2009).

International Search Report and Written Opinion issued in PCT Application No. PCT/US18/37655 on Oct. 29, 2018.

Invitation to Pay Additional Fees issued in PCT Application No. PCT/US2018/037655 on Aug. 28, 2018.

James Lee, "Advisory Action", issued Apr. 13, 2020, U.S. Appl. No. 15/655,972.

James Lee, "Final Office Action", issued Apr. 15, 2021, U.S. Appl. No. 15/945,617.

James Lee, "Final Office Action", issued Dec. 31, 2019, U.S. Appl. No. 15/655,972.

James Lee, "Non-Final Office Action", issued Aug. 7, 2019, U.S. Appl. No. 15/655,972.

James Lee, "Non-Final Office Action", issued Oct. 7, 2020, U.S. Appl. No. 15/945,617.

James Lee, "Notice of Allowance", issued Jun. 25, 2021, U.S. Appl. No. 15/945,617.

(56) References Cited

OTHER PUBLICATIONS

James Lee, "Restriction Requirement", issued Apr. 23, 2019, U.S. Appl. No. 15/655,972.
James Lee, "Restriction Requirement", issued May 12, 2020, U.S. Appl. No. 15/945,617.
M. R. Morgan and R. L. Lang, "Towards developing product applications of thick origami using the offset panel technique," Mech. Sc. 7, pp. 69-77 (2016).
MIT M-Blocks Page, https://www.technologyreview.com/s/523576/cubes-that-self-assemble/ (last accessed Jul. 21, 2017).
MTRAN3 Robot Page, http://www.robotpark.com/academy/modular-robots-mtran3/ (last accessed Jul. 21, 2017).
NASA SunTower Article, https://science.nasa.gov/science-news/science-at-nasa/2001/ast23mar_1 (last accessed Apr. 4, 2018).
Office Action issued in Canadian Application No. 3,070,366 on Mar. 26, 2021.
Office Action issued in Canadian Application No. 3.070,389 on Mar. 15, 2021.
Patty Inglish, "The First Nation State in Space was Founded in Oct. 2016," available at https://web.archive.org/web/20161015011116/https://hubpages.com/education/The-First-Human-Nation-State-in-Space-Was-Founded-in-October (last accessed Nov. 2, 2018).
PCT/ISA/206 form issued in PCT Application No. PCT/US2018/037651 on Aug. 6, 2018.
Polymorphic Robotics Laboratory Page, https://www.isi.edu/robots/ (last accessed Jul. 21, 2017).
Supplementary European Search Report issued in EP Application No. 18836031.7 on Mar. 11, 2021.
Supplementary European Search Report issued in European Application No. 18834388.3 on Feb. 26, 2021.
Wikipedia Mobius Strip Article, https://en.wikipedia.org/wiki/M%C3%B6bius_strip (last accessed Apr. 4, 2018).

W-M Shen, B. Salemi, P. Will, "Horomone-inspired adaptive communication and distributed control for CONRO self-configurable robots," IEEE Trans. Robotics & Automation, 18(5), p. 700 (2002).
James Lee, "Decision on Appeal", issued Feb. 10, 2022, U.S. Appl. No. 15/655,972.
Office Action issued in Canadian Application No. 3,070,366 on Nov. 18, 2021.
Office Action issued in Canadian Application No. 3,070,389 on Nov. 10, 2021.
James Lee, "Notice of Allowance", issued Dec. 28, 2022, U.S. Appl. No. 15/655,972.
Examination Report issued in Australian Application No. 2018303552 on Jul. 8, 2022.
Office Action issued in Japanese Application No. 2020-524712 on Jul. 4, 2022.
First Examination Report issued in Australian Application No. 2018303551 on Jul. 7, 2022.
Notice of Acceptance issued in Australian Application No. 2018303552 on Aug. 19, 2022.
Notice of Grant issued in Japanese Application No. 2020-524713 on Aug. 3, 2022.
Office Action issued in Canadian Application No. 3,070,389 on Aug. 24, 2022.
1 Magdalena TOPOLSKI, "Notice of Allowance", issued May 13, 2025, U.S. Appl. No. 18/185,709.
Office Action, issued May 1, 2025, CA Patent Application No. 3,206,759.
Magdalena Topolski, "Non-Final Office Action", issued Apr. 9, 2025, U.S. Appl. No. 18/335,954.
Magdalena Topolski, "Final Office Action", issued Jul. 17, 2025, U.S. Appl. No. 18/335,954.
Magdalena Topolski, "Notice of Allowance", issued Dec. 8, 2025, U.S. Appl. No. 18/335,954.

* cited by examiner

FIG. 2B
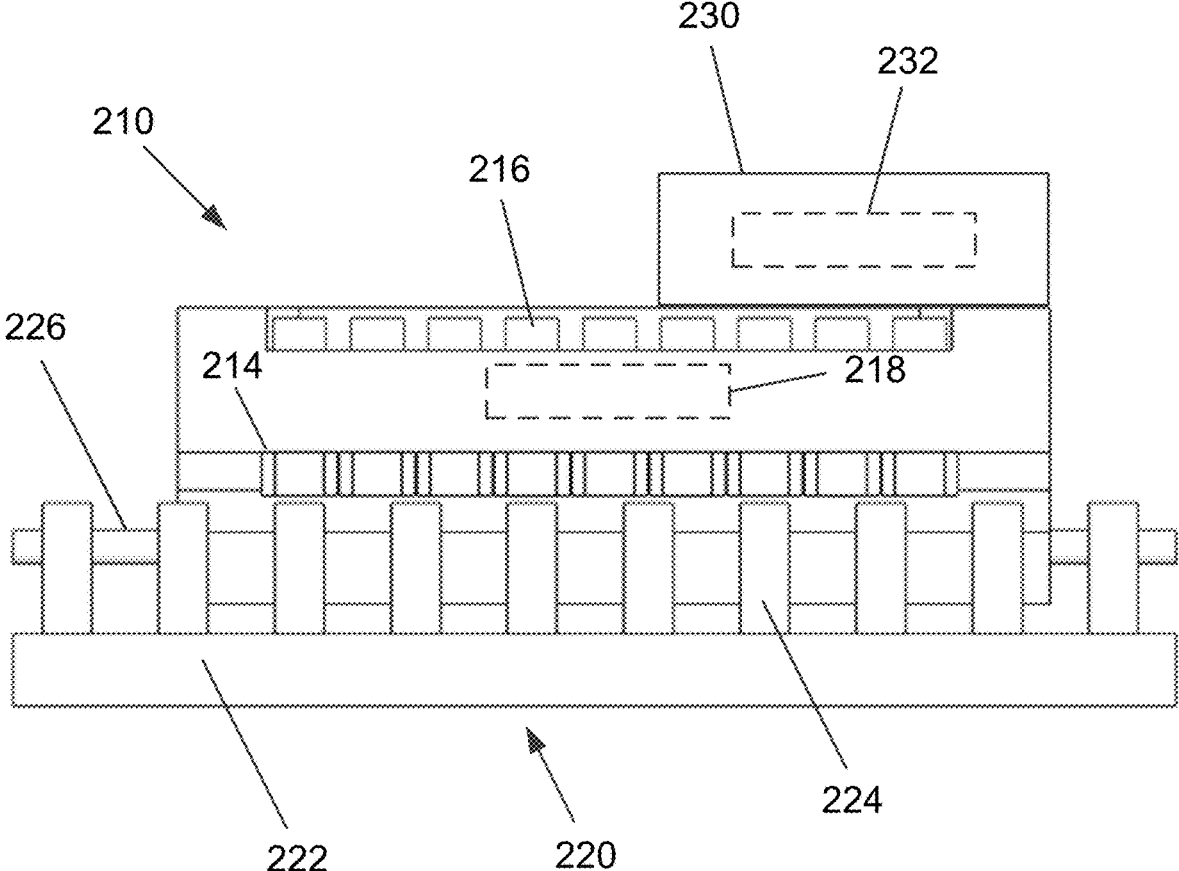

200

210

220

200

210

220

300

310

TRAM SYSTEMS FOR SPACE VEHICLES

CROSS-REFERENCE TO RELATED APPLICATIONS

This application is a continuation-in-part of U.S. Non-provisional patent application Ser. No. 15/945,617 filed Apr. 4, 2018, which is a continuation-in-part of U.S. Nonprovisional patent application Ser. No. 15/655,972 filed Jul. 21, 2017. The subject matter of these earlier filed applications is hereby incorporated by reference in its entirety.

FIELD

The present invention generally pertains to space systems, and more particularly, to tram systems for space vehicles.

BACKGROUND

Existing electromagnetic drive systems for space application typically utilize brushless direct current (DC) motors. These motors are usually built with a wound stator and a permanent magnet rotor. The motors for space applications can have various configurations, including three-phase permanent magnet (PM) rotary or linear brushless DC (BLDC), hybrid steppers, two-phase and three-phase alternating current (AC) synchronous motors, etc. Three-phase and stepper motors have been used for over 50 years. Some space vehicles, such as cell-type space vehicles with nested rings or hoops, use a drive system to position trams at various points around the rings. Current linear motors can be thought of as a traditional rotary motor that is split and laid flat or along the curve of a ring. These linear motors typically have the coils on one side and magnets on the other.

To use linear motors for trams of a cell-type space vehicle with nested rings, the tram would have to include either the coils or the magnets and the ring would have to include the other component not included in the tram. However, this arrangement requires the ring to have a large number of exposed magnets or a complex system of coils. Both options are complex. Accordingly, an improved mechanism may be beneficial.

SUMMARY

Certain embodiments of the present invention may be implemented and provide solutions to the problems and needs in the art that have not yet been fully solved by existing space vehicle tram mechanisms. For example, some embodiments pertain to tram systems for space vehicles, such as satellites, spacecraft, space stations, etc.

In an embodiment, a movable tram for a space vehicle includes control electronics configured to control operation of the movable tram. The movable tram is configured to move along at least a portion of a track of a space vehicle. The movable tram is also configured to connect to at least one other space vehicle, at least one other tram of another space vehicle, at least one other structure, or any combination thereof, provide power, data, fuel, heat, or any combination thereof, to at least one other space vehicle, act as a support structure that holds external components that can be articulated, or any combination thereof.

In another embodiment, a movable tram includes a primary coil, a plurality of armature teeth, and respective motor coils wound around the plurality of armature teeth on an end of the armature teeth closest to a conducting track. The movable tram also includes control electronics configured to perform motor commutation and control operation of the movable tram. The movable tram is a component of a space vehicle.

In yet another embodiment, a movable tram includes a primary coil, a plurality of armature teeth, and respective motor coils wound around the plurality of armature teeth on an end of the armature teeth closest to a conducting track. The movable tram also includes control electronics configured to perform motor commutation and control operation of the movable tram and a mechanical system configured to hold the tram on the conducting track when the primary coil and the motor coils are not powered on. The movable tram is a component of a space vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1B is a top cutaway view illustrating a wiring scheme in the nested-cell ring, according to an embodiment of the present invention.

FIG. 2B is a perspective view illustrating the tram system of FIG. 2A, according to an embodiment of the present invention.

Unless otherwise indicated, similar reference characters denote corresponding features consistently throughout the attached drawings.

DETAILED DESCRIPTION OF THE EMBODIMENTS

Figure 1A:
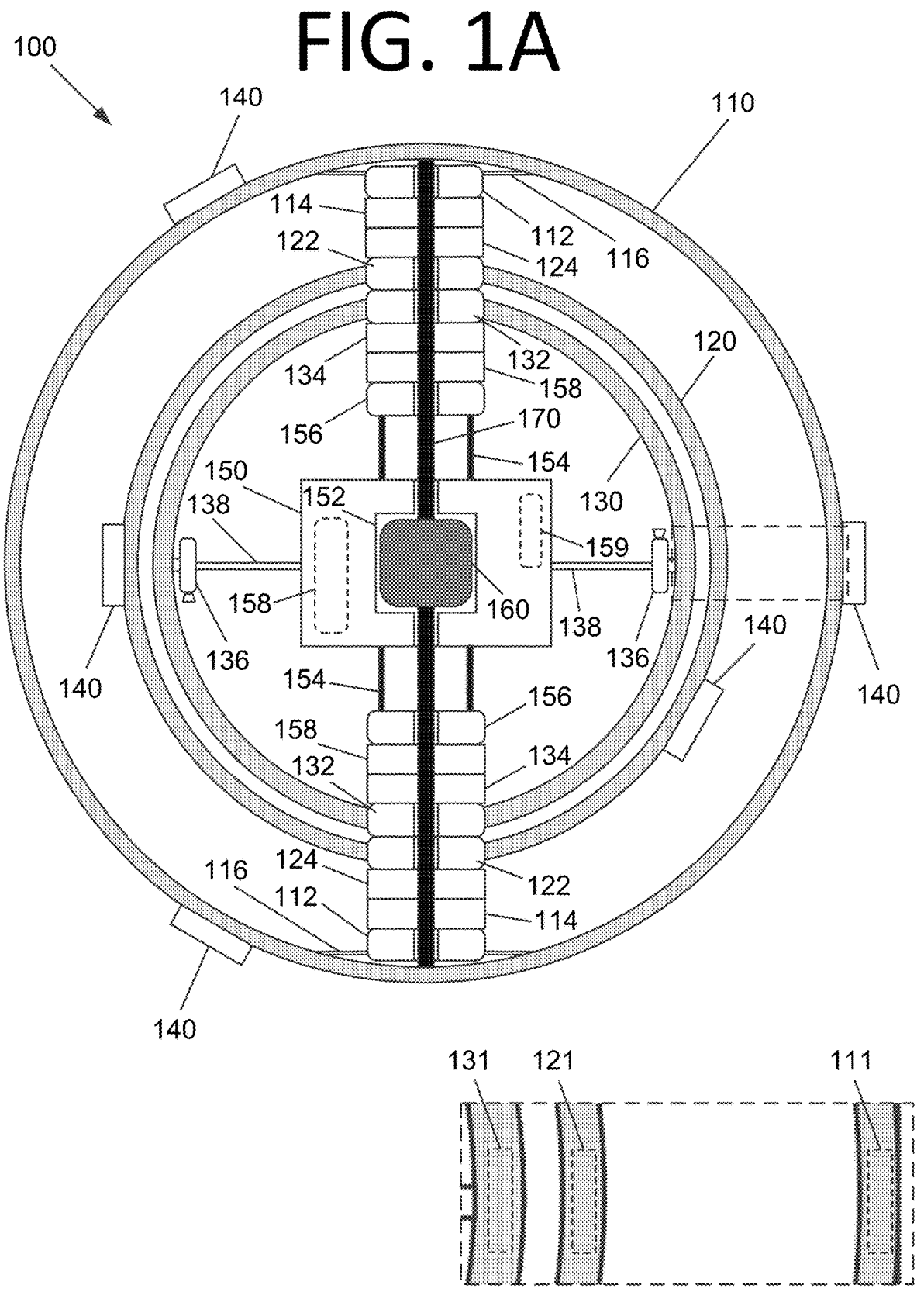
FIG. 1A is a top view illustrating a nested-ring cell, according to an embodiment of the present invention.

Some embodiments of the present invention pertain to tram systems for space vehicles. In embodiments where the space vehicle is a nested ring cell, for example, the structural ring portion of the design may be mostly or completely passive and contain conducting parts, such as electrical steel. The moving trams may use field coils instead of magnets to generate the magnetic flux to propel the tram. Additional coils on the tram may steer the magnetic flux to generate the forward or reverse thrust forces. These coils may also add the overall motive flux.

The tram motor in some embodiments is a form of a DC field excited three-phase AC linear motor. The tram may generate the clamping forces that hold the tram on to the space vehicle (e.g., on a structural hoop). The clamping forces may be reacted with rollers, casters, linear bearings, or any other suitable low friction mechanism without deviating from the scope of the invention. The tram may make connections to electrical tracks imbedded in the "track" or "rail", such as a structural ring, to complete power circuits, communication networks, and/or other signals. The tram may provide the mechanical mounting fixtures where other devices can be mounted. See, for example, U.S. Nonprovisional patent application Ser. No. 15/945,617 and Ser. No. 15/655,972, the benefit of which is claimed herein. Such devices may include, but are not limited to, grapplers, instruments, sensors, solar panels, etc.

A limitation of standard BLDC motors is the two-piece architecture. The motors typically have the windings on the stator and magnets on the armature. Linear motors typically do not have the continuous motion capability that is required for the tram drive system on structural rings or other structures of some embodiments.

The tram systems of some embodiments solve various problems that arise in applying existing trams to space vehicles. The tram of some embodiments positions grapplers that are used to connect adjacent structural rings. Electrical and communication connections can be established with the structural ring that can then be extended through the attached grappler to adjacent rings. This reduces the generation of stray magnetic fields. Such embodiments may be useful for small satellites and constellations of microsatellites. However, such trams may be used for any space application in space vehicles of any size without deviating from the scope of the invention.

In some embodiments, the cross-section of the ring may be circular, rectangular, hexagonal, T-shaped, irregular, have a changing shape along the ring, or any other suitable shape that accommodates the tram (which, in some embodiments, may be designed to accommodate the shape of the ring) without deviating from the scope of the invention. Also, while the term "ring" is used herein, it should be appreciated that this term is intended to refer to any desired track shape that may be employed without deviating from the scope of the invention. For instance, the ring may be circular, elliptical, irregular (e.g., similar to a noodle of spaghetti bent in various directions), etc. Also, the ring may have varying thicknesses along its length.

FIG. 1A shows a nested ring structure that is designed to rotate about one axis (shown as the y-axis here via shaft 170). In some embodiments, some nested rings rotate about a y-axis shaft, while others rotate about an x-axis shaft perpendicular to the y-axis via a gimbaled mechanism. In certain embodiments, these shafts may not be orthogonal to one another. Indeed, any number of shafts, interconnection therebetween, gimbaling mechanisms, and orientation may be used without deviating from the scope of the invention.

A payload/control section 150 includes a reaction wheel housing 152 that houses a momentum management system 160. Momentum management system 160 controls the net angular momentum vector, and includes reaction wheels (e.g., three-axis reaction wheels) and a momentum dumping system (e.g., magnetorquers) that enable the desaturation of the momentum of the reaction wheels. Each nested ring 110, 120, 130 and payload/control section 150 has its own respective motors 112, 122, 132, 156 and can independently rotate. The rotation can be continuous, fixed angular motion that is then stopped, or motion to a prescribed set of angular locations with stops at constant or varying times without deviating from the scope of the invention. Any rotation induced by motors 112, 122, 132, 156 should be countermanded by momentum management system 160 to keep the overall attitude (i.e., a defined observation direction) of nested ring cell 100 steady.

Motors 112 are attached to outer ring 110 via support structure 116, but are able to rotate about shaft 170 while attached thereto. Motors 122 are attached to middle ring 120, but are able to rotate about shaft 170 while attached thereto. Motors 132 are attached to inner ring 130, but are able to rotate about shaft 170 while attached thereto. Also, motors 156 are attached to payload/control section 150 via tubes/struts 154, but are able to rotate about shaft 170 while attached thereto. All motors 112, 122, 132, 156 in this embodiment have properties currently found in rotation stages with a center hole aperture: (1) bidirectional motion with velocity control; (2) encoders to ensure precise angular motion and positioning; and (3) mechanical clutches to lock. Motors 112, 122, 132, 156 are also designed to operate in a vacuum environment. In some embodiments, the motor function can be integrated into shaft 170. In certain embodiments, only one motor per ring is used.

Thus, rings 110, 120, 130 and payload/control section 150 rotate about shaft 170. Shaft 170 may also include data and/or power lines that provide data and/or power between rings 110, 120, 130 and payload/control section 150. In some embodiments, shaft 170 may also contain one or more propellant fuel lines to deliver propellant to one or more rings. This may be used, for instance, to control rotation thereof, as well as to control and power each tram 140 and a sensor or other device that "rides" on top of the tram if such a device is included.

Payload control section 150 also includes a primary propellant storage tank 158 and a secondary propellant storage tank 159. Secondary propellant storage tank 159 may function as a reserve in some embodiments. Any number, size, and location of propellant storage tanks may be used without deviating from the scope of the invention. Propellant storage tanks 158, 159 are connected to propellant lines 138 (connection not shown) and include electronic valves (not shown) that control the flow of propellant.

Figure 1B:
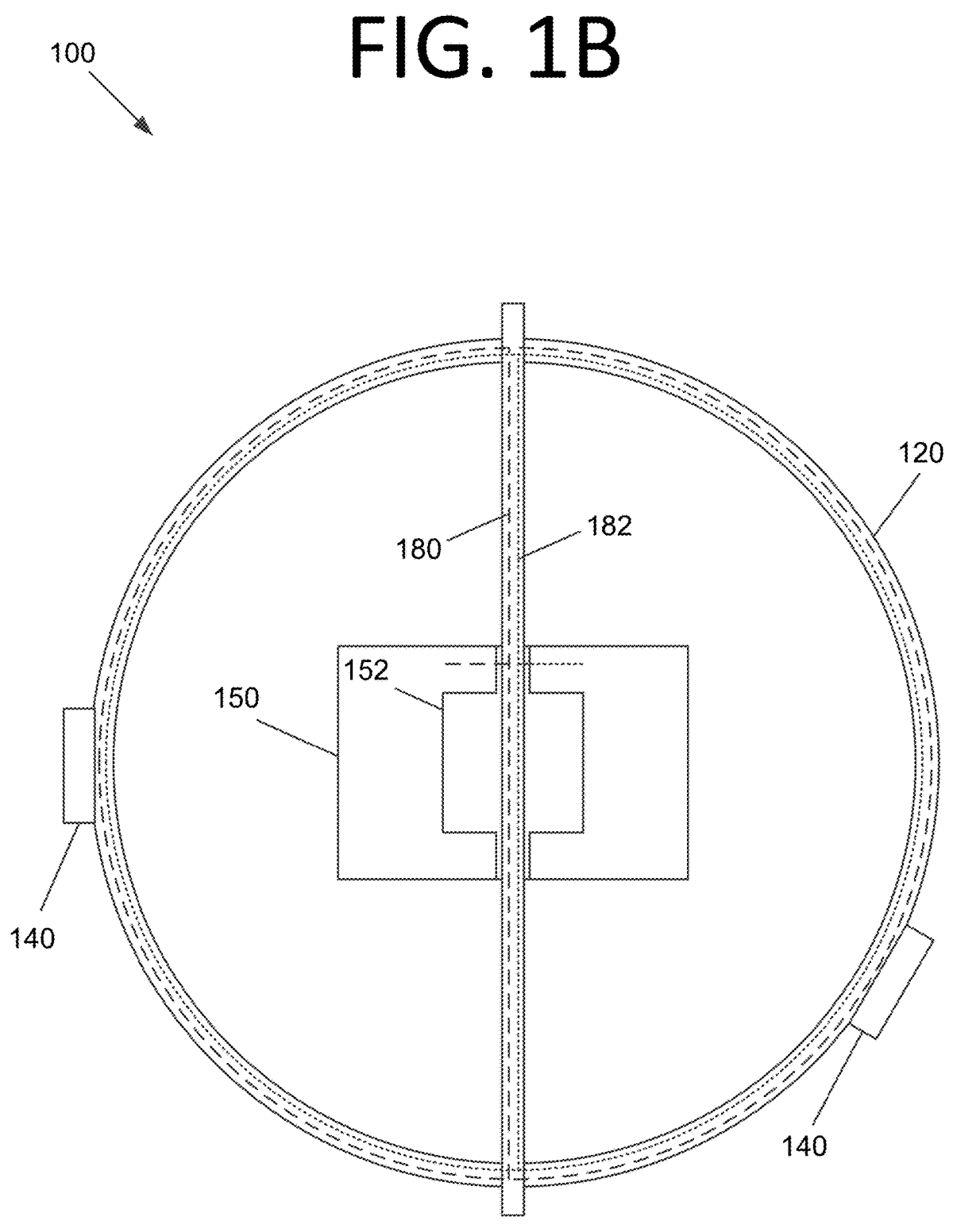

FIG. 1B is a top cutaway view illustrating a wiring scheme in nested-cell ring 100, according to an embodiment of the present invention. The wiring can be traditional metal conductors, optical fiber, 3D printed, pattern transfer fastened/bonded, etc. with interconnects as desired or necessary. In some embodiments, the wiring may be within the ring, wrapped about the ring, or any combination thereof without deviating from the scope of the invention. Various components from FIG. 1A have been removed and colors have been changed to white for illustration purposes. More specifically, ring 120 remains, and the wiring scheme for ring 120 may be similar to that for ring 110 or any other ring that requires power/data for its operation (e.g., to operate trams 140). Power lines 180 (lines with larger dashes) and data lines 182 (lines with smaller dashes) extend through shaft 170 and also throughout ring 120. Power line 180 and data line 182 also extend into payload/control section 150 and interface with internal circuitry thereof (not shown). Power and data may be transferred to payload/control section 150 and/or one or more of rings 110, 120, 130 via a direct-contact "brush" and/or non-contact optical, RF, or electromagnetic transport in certain embodiments. Rings 110, 120, 130 may be constructed from a conducting metal, for instance, that helps to facilitate the movement of trams 140. In some embodiments, trams may be capable of performing various operations, such as connecting to other cells to form a structure, to provide power and/or data and to act as support structures to hold external components that can be articulated (e.g., sensors, cameras, transmitters and/or receivers, mirrors, solar panels, heat shields, mirrors, lenses, etc.), and the like.

FIGS. 2A-D illustrate a tram system 200, according to an embodiment of the present invention. In some embodiments, tram 210 may be tram 140 of FIG. 1A. A relatively large primary coil 212 and smaller motor coils 214 on armature teeth 216 allow tram 210 to move forwards and backwards. It should be noted that permanent magnets are not used to achieve motion of tram 210.

A conducting track 220 (e.g., constructed from conducting metal) includes a track backing 222 and magnetic cross ties 224, as well as linear bearings 226 along which tram 210 rides. Linear bearings 226 pass through respective passages 217 in tram 210. Track backing 222 can be a magnetic or a non-magnetic material. Magnetic cross ties 224 provide part of the flux path. However, any desired shape of track may be used without deviating from the scope of the invention. For instance, conducting track 220 may be ring shaped, elliptical, irregular, etc. Also, in certain embodiments, linear bearings may not be used. For instance, wheels, casters, rollers, etc. may be used to allow tram 210 to move along conducting track 220 without losing contact with conducting track 220.

When the motor (i.e., primary coil 212 and motor coils 214) is on, the motor creates a force that holds tram 210 on track 220. When the tram motor is off, there are no clamping forces from the motor. As such, in some embodiments, a mechanical system is provided that that holds tram 210 on track 220 when the motor is off. This system may include the above-mentioned linear bearings, wheels, rollers, casters, rollers, respective receiving mechanisms of tram 210 and/or track 220, etc. Any suitable mechanisms for holding tram 210 on track 220 may be used without deviating from the scope of the invention.

In this embodiment, linear bearings 226 and associated passages 217 also keep tram 210 attached to conducting track 220 in an unpowered state. This is particularly important in space, where tram 210 could otherwise float away from the associated space vehicle. In embodiments that use other configurations (see, e.g., FIG. 4), supports may be used to keep tram 210 in place.

Tram 210 has a microcontroller 218 that performs motor commutation and makes tram 210 move by powering the primary coil, and motor coils 212. Microcontroller 218 may also cause tram 210 to provide power and communications to an attached payload. Such payloads may include, but are not limited to, linking mechanisms configured to perform linking operations with trams of other space vehicles and/or structures, sensors, cameras, solar panels, batteries, propellant, motors, rocket engines, mirrors, lenses, transmitters, receivers, antennas, lasers, LIDAR, other devices, any combination thereof, etc.

Some embodiments take advantage of the fact that the motor only needs to provide a relatively small amount of torque in order to move a relatively large mass. For instance, in one study for an embodiment, 0.01 Newton meters (Nm—0.01 N on a 2-meter diameter hoop) were needed to move an attached hoop on the order of 20 kilograms (kg). The tram magnetics model showed about 0.4 Nm available. This indicates that up 800 kg could be accelerated at the rate indicated in the study. However, it should be noted that the magnetics were not fully optimized, and there is room for improved performance. This relatively small amount of torque can be accomplished using a relatively small amount of power (e.g., 20 watts or less), which is advantageous for power-constrained space vehicles.

In operation, primary coil 212 is energized by the drive electronics by applying voltage to primary coil 212 when commanded by microcontroller 218. The voltage is selected to create the desired current in primary coil 212 and motor coils 214 to generate the required magnetomotive force (MMF) for tram system 200. The MMF is proportional to the current in primary coil 212 and the number of turns in primary coil 212. For instance, 1 amp in a 250-turn coil would produce 250 amp-turns of MMF. The MMF is converted to flux by dividing by the reluctance of the closed loop magnetic path that includes tram 210 and conducting track 220. This is the primary source of magnetic flux in tram system 200 that will generate motion. Motor coils 214 behave in a similar manner, but with much lower MMF being generated (e.g., 1/10th of the MMF of primary coil 212).

The primary function of motor coils 214 is to steer the flux across the airgap between conducting track 220 and armature teeth 224 in such a manner that a resultant force is created that propels tram 210 in the desired direction. This is accomplished by microcontroller 218 and drive electronics 232, which apply a voltage to selected coils of motor coils 214 that guides the flux of primary coil 212 in a manner that creates a net force. Drive electronics 232 are located in a housing 230 that rides on top of and is operably connected to tram 210. See FIG. 2B. Microcontroller 218 then switches voltages for motor coils 214 in a manner that causes tram 210 to move in a smooth, continuous motion.

Figure 2A:
FIG. 2A is a perspective cutaway view illustrating a tram system, according to an embodiment of the present invention.
Figure 2C:
FIG. 2C is another perspective view illustrating the tram system of FIG. 2A, according to an embodiment of the present invention.
Figure 2C:
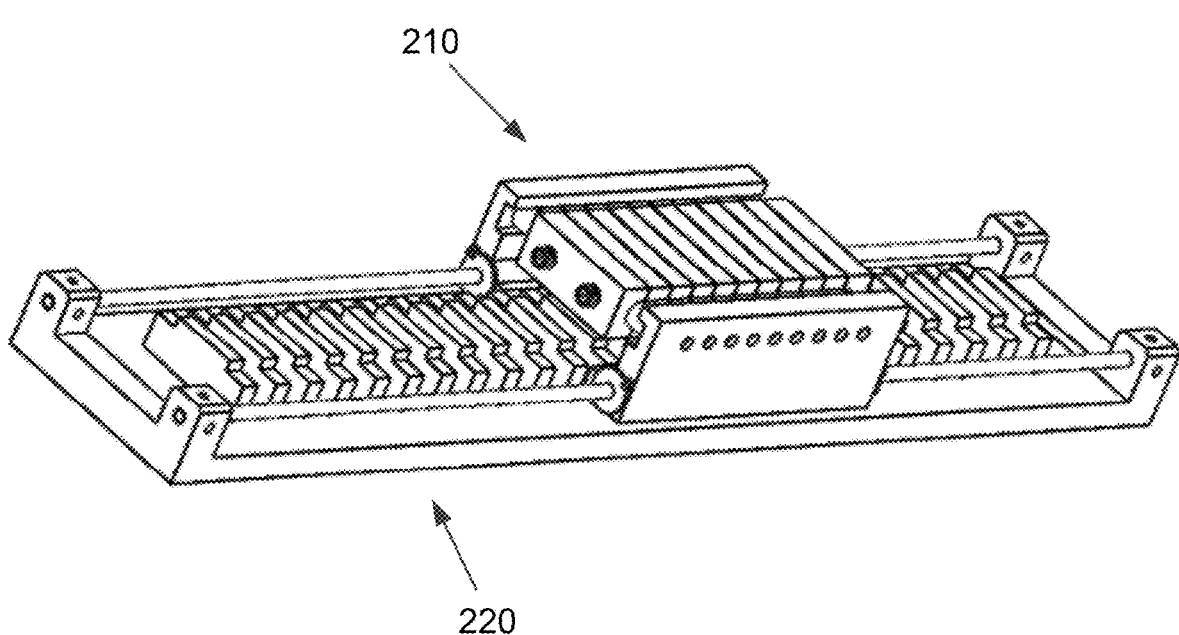
Figure 2D:
FIG. 2D is yet another perspective view illustrating the tram system of FIG. 2A, according to an embodiment of the present invention.
Figure 2D:
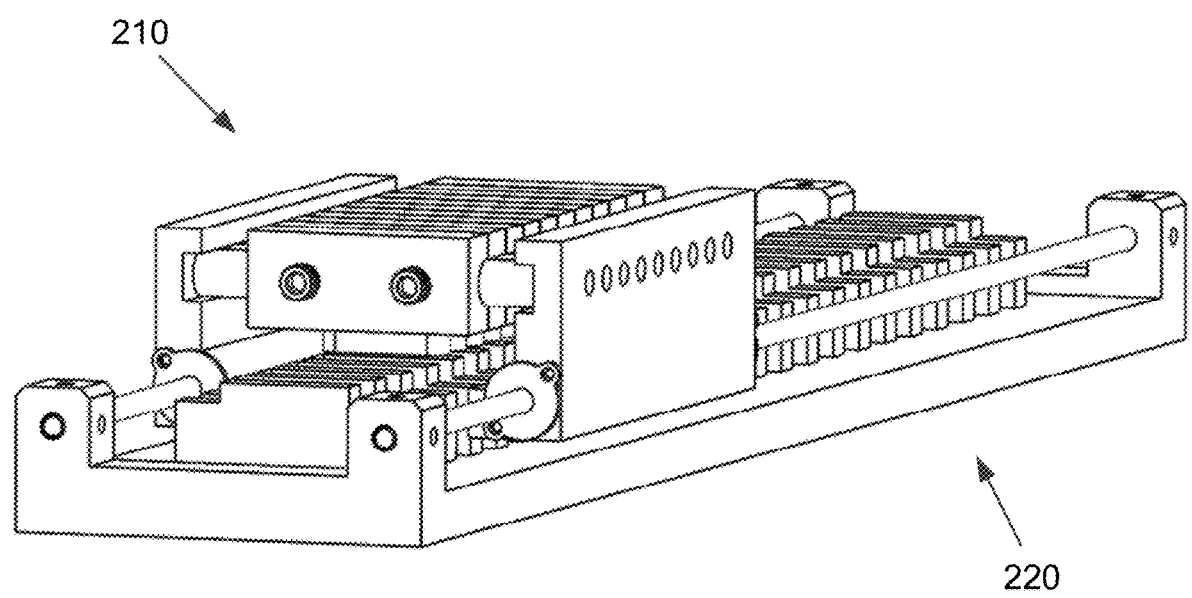
Figure 3A:
FIG. 3A is a flux density diagram illustrating magnetic flux density from an end view of the tram of FIG. 2A, according to an embodiment of the present invention.

FIG. 3A is a graph 300 illustrating magnetic flux density from an end view of the tram of FIG. 2A, according to an embodiment of the present invention. Primary coil 212, when energized, produces magnetic flux. The flux density is greatest in the core of primary coil 214 and is depicted in FIG. 3A as area (1) in the upper left. The flux then turns and flows down the outer ferromagnetic material (2). This material is sometimes referred to as the "back iron" or "pole piece" of the magnetic machine. The flux is guided by the back iron to the first of two airgaps (3). The flux crosses the first airgap into the track material. The track then guides the flux to the second airgap (4), where the motor coils direct the flux into teeth that will result in the desired motion. Finally, the flux returns to the primary coil (5), completing the magnetic circuit.

Figure 3B:
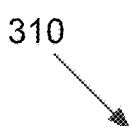
FIG. 3B is a flux density diagram illustrating magnetic flux density from a side view of the tram of FIG. 2A, according to an embodiment of the present invention.
Figure 3B:
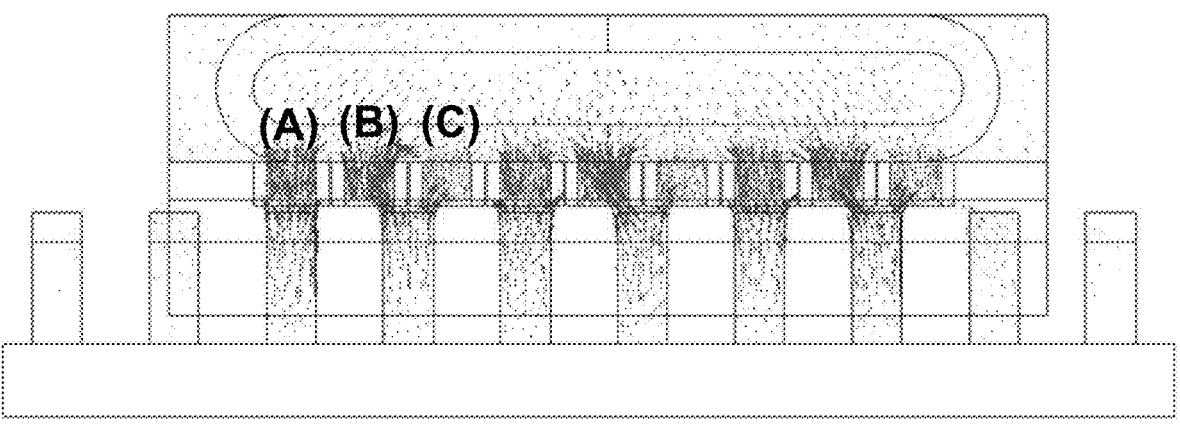

FIG. 3A is a flux density diagram 300 illustrating magnetic flux density from a side view of the tram of FIG. 2A, according to an embodiment of the present invention. In FIG. 3A, the tram is operating as described above. Here, the redirection of the flux by the motor coils is seen. Motor coil on tooth (B) is energized with the resulting flux crossing the airgap at an angle. The angular nature of the flux crossing the airgap generates the resulting forces. In flux density diagram 310 of FIG. 3B, the repeating nature of teeth A, B, and C is also shown.

Figure 4A:
FIG. 4A is a perspective view illustrating a tram system with a device mount in a retracted position, according to an embodiment of the present invention.
Figure 4B:
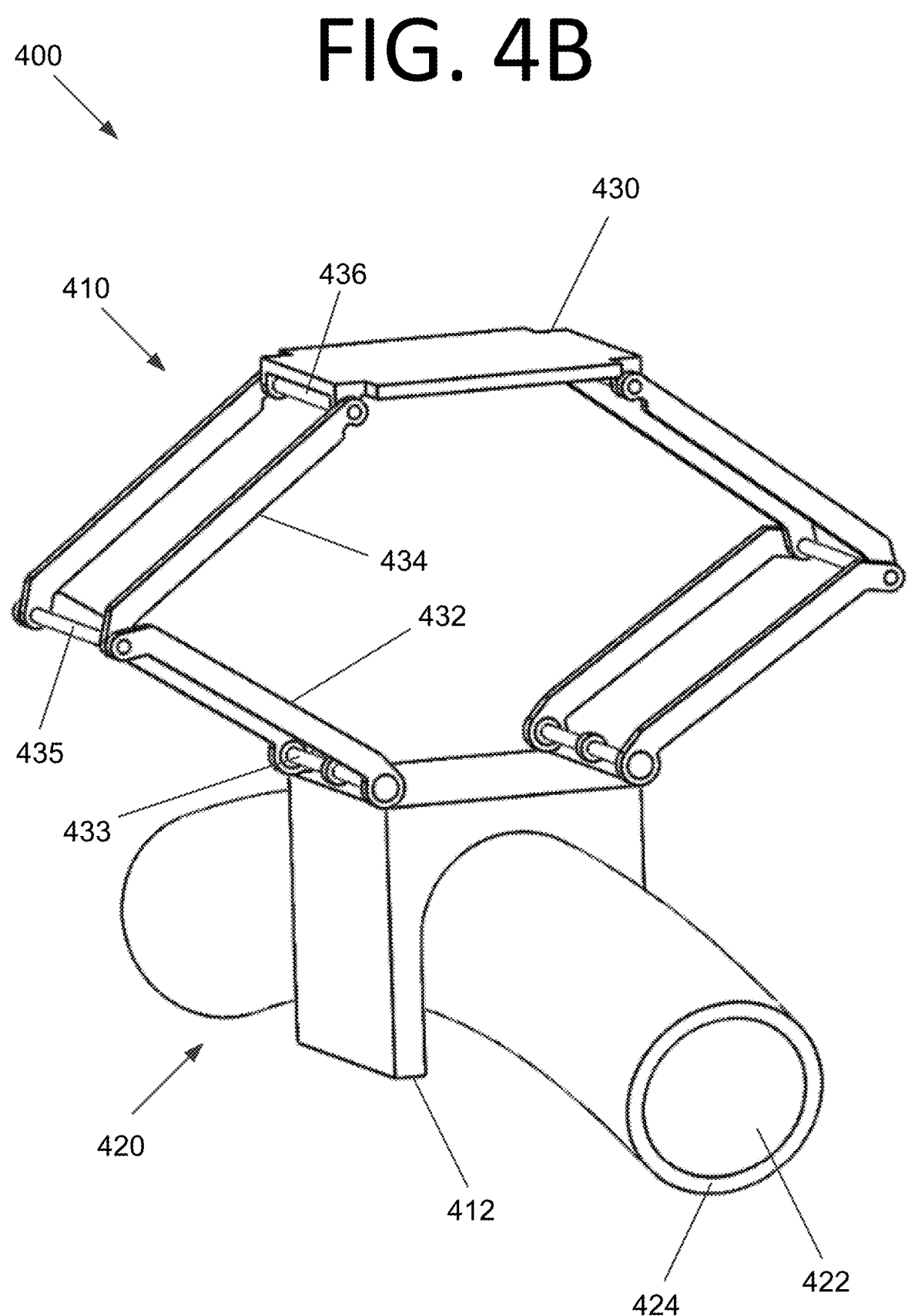
FIG. 4B is a perspective view illustrating the tram system of FIG. 4A with the device mount in a half-extended position, according to an embodiment of the present invention.
Figure 4C:
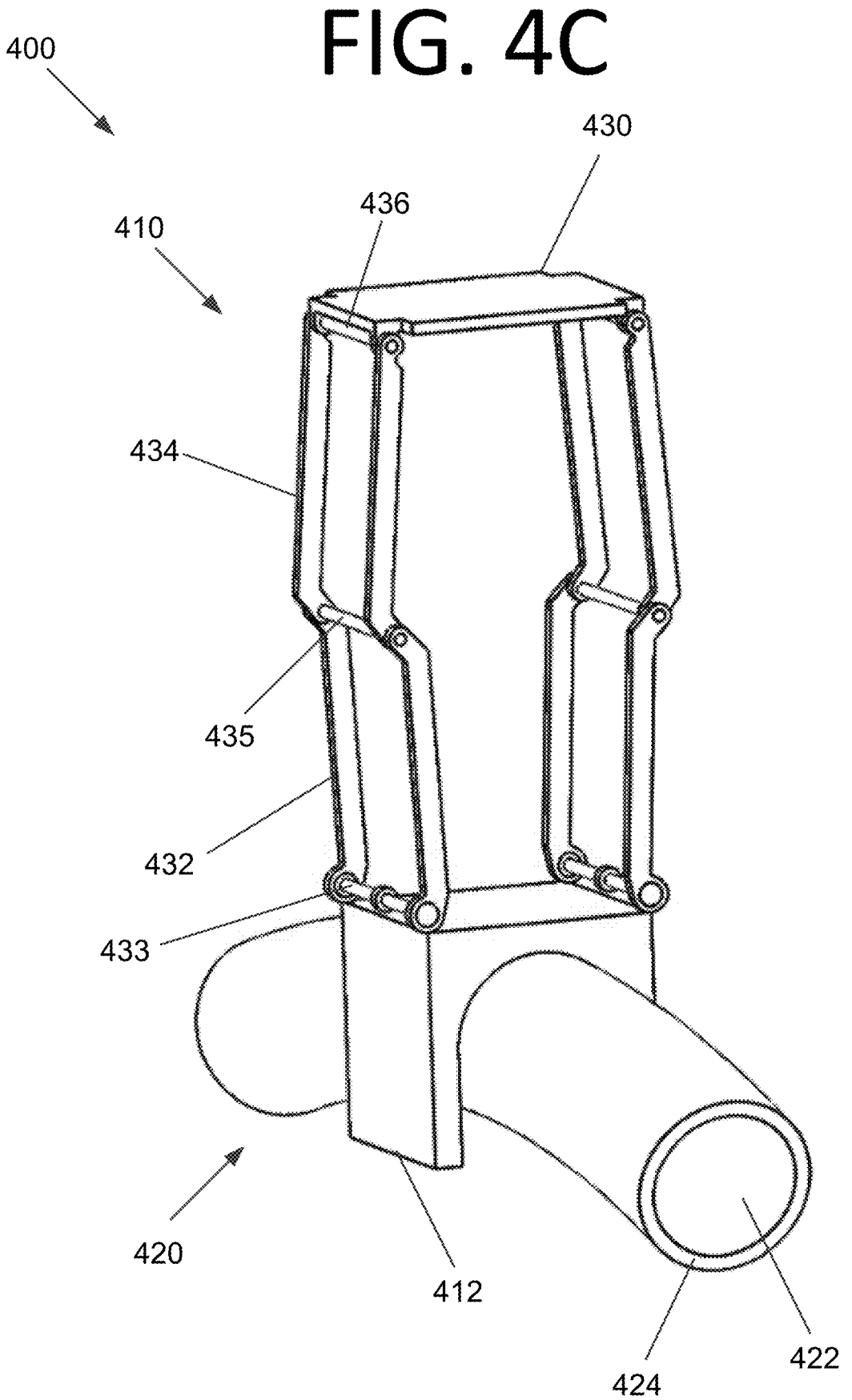
FIG. 4C is a perspective view illustrating the tram system of FIG. 4A with the device mount in a fully extended position, according to an embodiment of the present invention.

FIGS. 4A-C are perspective views illustrating a tram system 400 with a device mount 430 in a retracted position, a half-extended position, and a fully extended position, respectively, according to an embodiment of the present invention. Tram system 400 includes a tram 410 and a conducting track 420. In this embodiment, conducting track 420 is tube-shaped, having a solid exterior 422 and a hollow interior 424. This may allow wires, electronics, fuel lines, etc. to be housed within hollow interior 424.

Tram 410 includes a tram body 412 that houses control electronics, electromagnets, etc. Device mount 430 can be extended from tram body 412 via inner supports 432, first hinges 433, outer supports 434, and second hinges 435. Third hinges 436 may be used to angle device mount 430.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A movable tram for a space vehicle, comprising:
control electronics configured to control operation of the movable tram, wherein
the movable tram comprises a motive side and a connecting side,
the movable tram is configured to move along at least a portion of a track on an exterior of the space vehicle via the motive side,
the movable tram is configured to make connections to electrical tracks embedded in the track of the space vehicle, and
the movable tram is configured to:
connect the connecting side of the movable tram to at least one other space vehicle, at least one other tram of another space vehicle, or both,
provide data, fuel, heat, or any combination thereof, to at least one other space vehicle,
act as a support structure that holds external components that can be articulated, or
any combination of the above.

2. The movable tram of claim 1, further comprising:
a linking mechanism that is configured to linking operations with linking members of other trams, with other structures, or both.

3. The movable tram of claim 2, wherein the linking mechanism comprises a layered interface comprising hardware and software that provides visual pose estimation for docking, testing of signals and information to be passed between trams, and security against cyber threats.

4. The movable tram of claim 2, wherein the linking mechanism is motorized and comprises a portion of a hinge joint, a pivot joint, a ball and socket joint, an ellipsoid in socket joint, a saddle joint, plane joint, a mechanical and magnetic interlock, or a spring-loaded ball and groove joint.

5. The movable tram of claim 1, further comprising:
a motorized hinge operably connected to the tram and a device, wherein
the hinge enables the device to flip out from the tram and deploy.

6. The movable tram of claim 5, wherein the device comprises a lens, a mirror, a shade, a filter, a flip-out sensor, a flip-out angular momentum control device, a patterned electrode that serves as a linear motor, or any combination thereof.

7. The movable tram of claim 1, further comprising:
a primary coil;
a plurality of armature teeth; and
motor coils wound around the plurality of armature teeth on an end of the armature teeth closest to a conducting track.

8. The movable tram of claim 7, wherein permanent magnets are not used to cause levitation of the movable tram.

9. The movable tram of claim 7, wherein the movable tram is configured to move along linear actuators.

10. The movable tram of claim 7, wherein the control electronics are configured to control magnetic flux of the primary coil and the motor coils.

11. A movable tram, comprising:
a primary coil;
a plurality of armature teeth;
respective motor coils wound around the plurality of armature teeth on an end of the armature teeth closest to a conducting track; and
control electronics configured to perform motor commutation and control operation of the movable tram, wherein
the movable tram is a component of a space vehicle, and
the conducting track is on an exterior of the space vehicle.

12. The movable tram of claim 11, further comprising:
a mechanical system configured to hold the movable tram on the conducting track when the primary coil and the motor coils are not powered on.

13. The movable tram of claim 12, further comprising:
respective passages for one or more linear bearings of the conducting track, wherein
the mechanical system comprises the respective passages and the linear bearings, and the movable tram is configured to move along linear actuators.

14. The movable tram of claim 11, wherein permanent magnets are not used to cause levitation of the movable tram.

15. The movable tram of claim 11, wherein the control electronics are configured to control magnetic flux of the primary coil and the motor coils.

16. The movable tram of claim 11, wherein the control electronics are configured to control the primary coil and the motor coils such that when powered on, the primary coil and the motor coils hold the movable tram on the conducting track.

17. The movable tram of claim 11, wherein power for the movable tram is provided exclusively by the conducting track.

18. The movable tram of claim 11, wherein
the controller is configured to provide power and communications from the conducting track to a payload attached to the movable tram, and
the attached payload comprises a linking mechanism configured to perform linking operations with trams of other space vehicles and/or structures, a sensor, a camera, solar panels, a battery, propellant, a motor, a rocket engine, a mirror, a lens, a transmitter, a receiver, an antenna, a laser, LIDAR, or any combination thereof.

19. The tram of claim 11, wherein the movable tram, when powered, is configured to move at least 1,000 kilograms (kg)

of payload for each Newton meter (Nm) of force generated by the movable tram via the primary coil and the motor coils using 20 watts (W) of power or less, facilitating maneuvers of a payload attached to the movable tram in space.

20. A movable tram, comprising:
a primary coil;
a plurality of armature teeth;
respective motor coils wound around the plurality of armature teeth on an end of the armature teeth closest to a conducting track;
control electronics configured to perform motor commutation and control operation of the movable tram; and
a mechanical system configured to hold the tram on the conducting track when the primary coil and the motor coils are not powered on, wherein
the movable tram is a component of a space vehicle, and
the conducting track is on an exterior of the space vehicle.

21. The movable tram of claim 20, further comprising:
respective passages for one or more linear bearings of the conducting track, wherein
the mechanical system comprises the respective passages and the linear bearings, and the movable tram is configured to move along linear actuators.

22. The movable tram of claim 20, wherein permanent magnets are not used to cause levitation of the movable tram.

23. The movable tram of claim 20, wherein the control electronics are configured to control magnetic flux of the primary coil and the motor coils.

24. The movable tram of claim 20, wherein the control electronics are configured to control the primary coil and the motor coils such that when powered on, the primary coil and the motor coils hold the movable tram on the conducting track.

25. The movable tram of claim 20, wherein power for the movable tram is provided exclusively by the conducting track.

26. The movable tram of claim 20, wherein
the controller is configured to provide power and communications from the conducting track to a payload attached to the movable tram, and
the attached payload comprises a linking mechanism configured to perform linking operations with trams of other space vehicles and/or structures, a sensor, a camera, solar panels, a battery, propellant, a motor, a rocket engine, a mirror, a lens, a transmitter, a receiver, an antenna, a laser, LIDAR, or any combination thereof.

27. The movable tram of claim 20, wherein the movable tram, when powered, is configured to move at least 1,000 kilograms (kg) of payload for each Newton meter (Nm) of force generated by the movable tram via the primary coil and the motor coils using 20 watts (W) of power or less, facilitating maneuvers of a payload attached to the movable tram in space.

* * * * *